(12) United States Patent
Ulrich

(10) Patent No.: US 6,895,438 B1
(45) Date of Patent: May 17, 2005

(54) TELECOMMUNICATION-BASED TIME-MANAGEMENT SYSTEM AND METHOD

(75) Inventor: Paul C. Ulrich, 355 The Promenade, Edgewater, NJ (US) 07020

(73) Assignee: Paul C. Ulrich, Southbury, CT (US)

(*) Notice: Subject to any disclaimer, the term of this patent is extended or adjusted under 35 U.S.C. 154(b) by 822 days.

(21) Appl. No.: 09/655,681

(22) Filed: Sep. 6, 2000

(51) Int. Cl.$^7$ ............................................... G06F 15/16
(52) U.S. Cl. ..................... 709/227; 709/219; 709/232; 707/1; 707/3; 707/6; 705/9; 704/201; 704/503; 455/66.1; 455/186.1; 455/566; 370/521; 370/522; 370/535; 345/716
(58) Field of Search ................................ 709/219, 232, 709/204, 224, 227, 233; 707/1, 3, 6; 705/9; 704/201, 503; 455/66.1, 186.1, 566; 370/521, 522, 535, 328; 345/716; 379/120; 719/329; 235/382

(56) References Cited

U.S. PATENT DOCUMENTS

| | | | |
|---|---|---|---|
| 5,418,951 A | 5/1995 | Damashek | 395/600 |
| 5,708,780 A | 1/1998 | Levergood et al. | 395/200.12 |
| 5,748,620 A * | 5/1998 | Capurka | 370/328 |
| 5,799,286 A | 8/1998 | Morgan et al. | 705/30 |
| 5,812,780 A * | 9/1998 | Chen et al. | 709/224 |
| 5,850,388 A | 12/1998 | Anderson et al. | 370/252 |
| 5,889,943 A | 3/1999 | Ji et al. | 395/187.01 |
| 5,909,493 A | 6/1999 | Motoyama | 380/25 |
| 5,909,672 A | 6/1999 | Madore et al. | 705/32 |
| 5,913,041 A * | 6/1999 | Ramanathan et al. | 709/233 |
| 5,917,489 A | 6/1999 | Thurlow et al. | 345/347 |
| 5,925,101 A | 7/1999 | Bayless et al. | 709/219 |
| 5,951,642 A | 9/1999 | Onoe et al. | 709/224 |
| 5,963,912 A | 10/1999 | Katz | 705/7 |
| 5,966,139 A | 10/1999 | Anupam et al. | 345/440 |
| 5,987,516 A | 11/1999 | Rao et al. | 709/227 |
| 5,991,365 A | 11/1999 | Pizano et al. | 379/88.13 |

(Continued)

FOREIGN PATENT DOCUMENTS

| | | |
|---|---|---|
| WO | WO98/38614 | 9/1998 |
| WO | WO99/65216 | 12/1999 |
| WO | WO00/17727 | 3/2000 |
| WO | WO00/17761 | 3/2000 |
| WO | WO00/17781 | 3/2000 |
| WO | WO00/17782 | 3/2000 |
| WO | WO00/17784 | 3/2000 |
| WO | WO00/17785 | 3/2000 |

*Primary Examiner*—Jack Harvey
*Assistant Examiner*—Hai V. Nguyen

(57) ABSTRACT

A proxy-server system (15) connected preferably to a computer-telephone system (10) intercepts, processes, and analyzes as traffic-analysis results (68A–C) all forms of real- and non-real-time electronic communication passing over the network in the form of raw traffic data (61). The proxy-server system normalizes each communication into the measure of time needed by recipient(s) of the communication to understand the information contained therein. Once normalized, the data may be aggregated into summary reports (69A–C). As part of the analysis, the aggregated communication records are compared with user-defined rules to provide alerts if the individual or aggregated durations exceed boundaries set by the rules. In one embodiment, the summary reports may be integrated with general-ledger data (94) and other raw business data (74) via a relational database (72) to derive more accurate records of activity-based-costing information (76). Additionally, the data of the summary reports may be visualized in two- or three-dimensional representations of communication-flow patterns to illustrate in an intuitive and semantically scalable manner the desired level of detail for time and time-based expense consumed by the electronic interactions of an individual or organization.

24 Claims, 15 Drawing Sheets

U.S. PATENT DOCUMENTS

| | | | |
|---|---|---|---|
| 5,991,742 A | 11/1999 | Tran | 705/32 |
| 6,070,190 A * | 5/2000 | Reps et al. | 709/224 |
| 6,220,512 B1 * | 4/2001 | Cooper | 235/382 |
| 6,338,097 B1 * | 1/2002 | Krenzke et al. | 719/329 |
| 6,563,920 B1 * | 5/2003 | Flockhart et al. | 379/265.1 |
| 6,587,877 B1 * | 7/2003 | Douglis et al. | 709/224 |
| 6,687,349 B1 * | 2/2004 | Caldwell et al. | 379/120 |
| 6,763,386 B2 * | 7/2004 | Davis et al. | 709/224 |
| 2003/0050977 A1 * | 3/2003 | Puthenkulam et al. | 709/204 |

* cited by examiner

Sample Log File Information and Normalized Time by Message

| 31A Date | 31B Time | 31C Recipient | 31D Manner | 31E Sender | 31F Subject Key Words | 31G Message Type | 31H Attachment Type | 31I Message Size (kb) | 31J Attachment Size (kb) | 31K Message Word Count | 31L Attachment Word Count | 31M Normalized Duration (min) |
|---|---|---|---|---|---|---|---|---|---|---|---|---|
| 17Jan00 | 8:34 EST | pulrich@ | | porondo@ | patent filing | email | MS Word | 7 | 122 | 84 | 3050 | 15.9 |
| 17Jan00 | 21:09 EST | pulrich@ | | kulrich@ | personal | email | n/a | 11 | n/a | 132 | n/a | 0.8 |
| 17Jan00 | 21:35 EST | pulrich@ | | jayang@ | business expense | email | MS Excel | 42 | 103 | 420 | n/a | 6.4 |
| | | porondo@ | | | " | " | " | 42 | 103 | 420 | n/a | 6.4 |
| 18Jan00 | 14:31 EST | porondo@ | | pulrich@ | prototype | email | n/a | 3 | n/a | 48 | n/a | 0.3 |
| | | jayang@ | cc | | | " | " | 3 | " | 48 | " | 0.3 |
| | | kulrich@ | bcc | | | " | " | 3 | " | 48 | " | 0.3 |
| 18Jan00 | 14:52 EST | pulrich@ | | jayang@ | re: prototype | fax | n/a | 132 | n/a | 550 | n/a | 2.9 |
| | | porondo@ | cc | | | " | " | 132 | " | 550 | " | 2.9 |
| 20Jan00 | 15:03 EST | lawyer@ | | pulrich@ | patent filing | email | MS Word | 15 | 356 | 135 | 7120 | 36.5 |
| | | porondo@ | cc | | | " | " | 15 | 356 | 135 | 7120 | 36.5 |
| | | jayang@ | cc | | | " | " | 15 | 356 | 135 | 7120 | 36.5 |
| | | kulrich@ | bcc | | | " | " | 15 | 356 | 135 | 7120 | 36.5 |
| 21Jan00 | 11:05 EST | pulrich@ | | lawyer@ | patent filing | email | wav file | 10 | 2200 | 120 | n/a | 5.2 |
| 21Jan00 | 11:25 EST | porondo@ | fw | pulrich@ | fw:patent filing | " | " | 11 | 2200 | 120 | n/a | 5.2 |
| | | jayang@ | fw | | | " | " | 11 | 2200 | 120 | n/a | 5.2 |
| | | kulrich@ | fw | | | " | " | 11 | 2200 | 120 | n/a | 5.2 |
| 21Jan00 | 18:35 EST | kulrich@ | | pulrich@ | personal | phone | n/a | n/a | n/a | n/a | n/a | 1.6 |

Total Duration (min) = 204.6  31N

FIG. 3A

Minutes of Time 41

41A By Subject: patent filing 47

| byof | pulrich@ | porondo@ | jayang@ | kulrich@ | lawyer@ | subtotals | % of total |
|---|---|---|---|---|---|---|---|
| pulrich@ | n/a | 42.0 | 42.0 | 42.0 | 36.5 | 162.5 | 85.8% |
| porondo@ | 15.9 | n/a | 0.0 | 0.0 | 0.0 | 15.9 | 8.4% |
| jayang@ | 2.9 | 2.9 | n/a | 0.0 | 0.0 | 5.8 | 3.1% |
| kulrich@ | 0.0 | 0.0 | 0.0 | n/a | 0.0 | 0.0 | 0.0% |
| lawyer@ | 5.2 | 0.0 | 0.0 | 0.0 | n/a | 5.2 | 2.7% |
| subtotals | 24.0 | 44.9 | 42.0 | 42.0 | 36.5 | 189.4 demanded |  |
| % of total | 12.7% | 23.7% | 22.2% | 22.2% | 19.3% | 189.4 supplied |  |

41B By Date: 17Jan00 (all subjects)

| byof | pulrich@ | porondo@ | jayang@ | kulrich@ | lawyer@ | subtotals | % of total |
|---|---|---|---|---|---|---|---|
| pulrich@ | n/a | 0.0 | 0.0 | 0.0 | 0.0 | 0.0 | 0.0% |
| porondo@ | 15.9 | n/a | 0.0 | 0.0 | 0.0 | 15.9 | 53.9% |
| jayang@ | 6.4 | 6.4 | n/a | 0.0 | 0.0 | 12.8 | 43.6% |
| kulrich@ | 0.8 | 0.0 | 0.0 | n/a | 0.0 | 0.8 | 2.6% |
| lawyer@ | 0.0 | 0.0 | 0.0 | 0.0 | n/a | 0.0 | 0.0% |
| subtotals | 23.1 | 6.4 | 0.0 | 0.0 | 0.0 | 29.5 demanded |  |
| % of total | 78.2% | 21.8% | 0.0% | 0.0% | 0.0% | 29.5 supplied |  |

41C By Period: 17Jan00-21Jan00 (all subjects)

| byof | pulrich@ | porondo@ | jayang@ | kulrich@ | lawyer@ | subtotals | % of total |
|---|---|---|---|---|---|---|---|
| pulrich@ | n/a | 42.0 | 42.0 | 43.6 | 36.5 | 148.5 | 80.2% |
| porondo@ | 15.9 | n/a | 0.0 | 0.0 | 0.0 | 15.9 | 7.8% |
| jayang@ | 9.3 | 9.3 | n/a | 0.0 | 0.0 | 18.6 | 9.1% |
| kulrich@ | 0.8 | 0.0 | 0.0 | n/a | 0.0 | 0.8 | 0.4% |
| lawyer@ | 5.2 | 0.0 | 0.0 | 0.0 | n/a | 5.2 | 2.5% |
| subtotals | 31.2 | 51.3 | 42.0 | 43.6 | 36.5 | 204.6 demanded |  |
| % of total | 15.2% | 25.1% | 20.5% | 21.3% | 17.8% | 204.6 supplied |  |

FIG. 3B

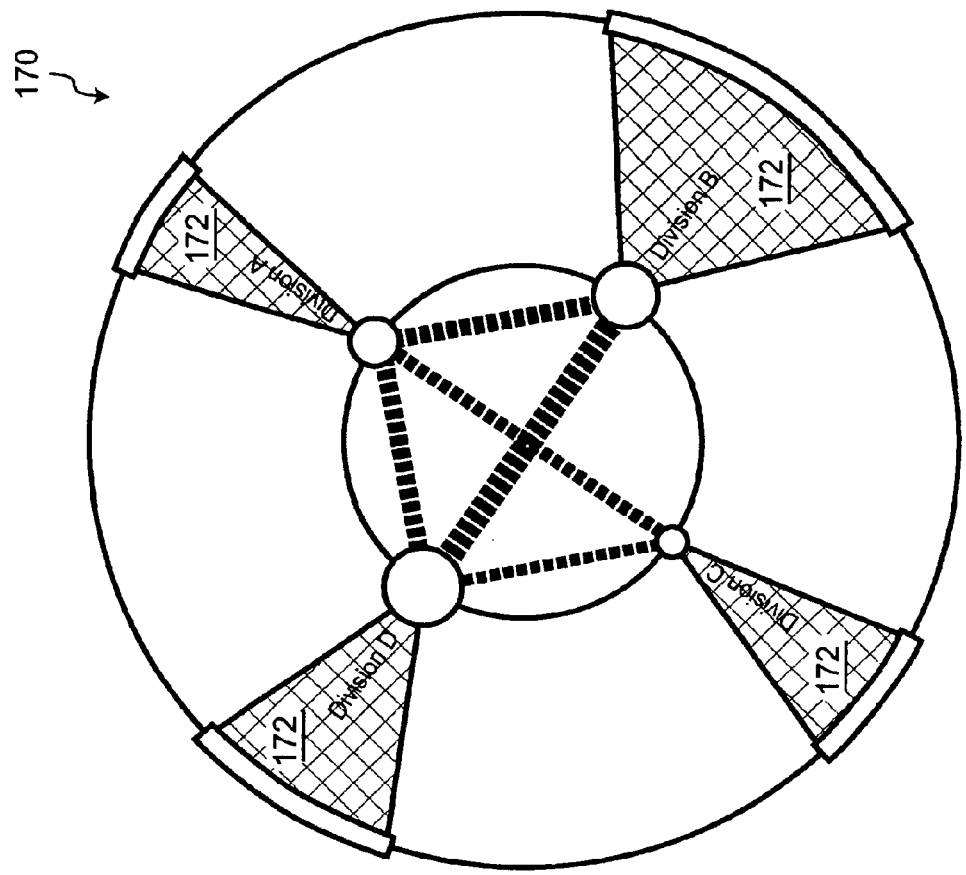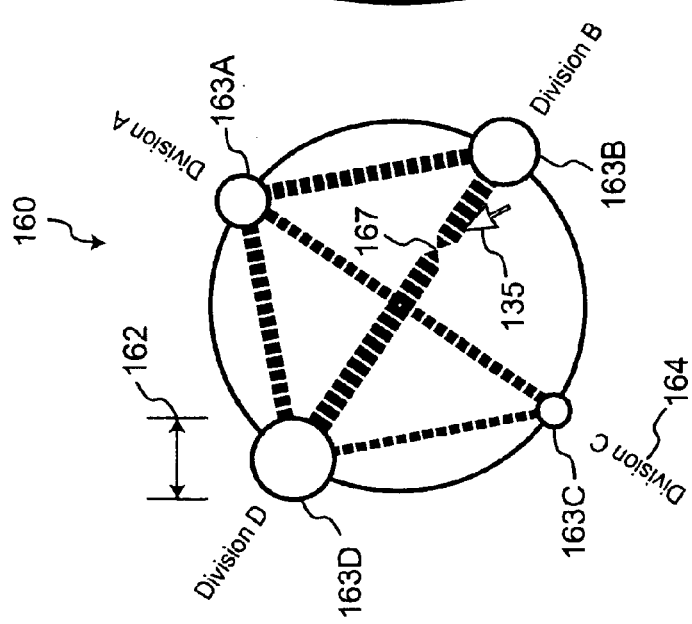
FIG. 13

TELECOMMUNICATION-BASED TIME-MANAGEMENT SYSTEM AND METHOD

BACKGROUND OF THE INVENTION

The invention relates to the development of a telecommunications-based, time-management solution for knowledge workers. It involves the creation and implementation of software for tracking, analyzing, and presenting in a visually compelling manner the volumes and directional flows of electronic communication within and among organizations and between individuals. Potential uses of the software solution in various aspects of the business include, but are not limited to, supply-chain management, project management, customer- and partner-relationship management, as well as human-resources management. Managers can also use the content gathered by the solution in an emerging area of knowledge management—the automatic recording of tacit knowledge to help identify persons in the organization with expertise, information, or contacts relevant to particular projects or problems.

Monitoring communication-traffic patterns in a visual format is not new. However, doing so for the purpose of business management is. Unlike the present invention, the systems to date have tracked and graphed communication flows primarily as a way to optimize network performance and, for example, avoid traffic congestion and bottlenecks.

In today's world of informational overload, attention has become the scarcest and most valuable resource. An increasing amount of time is devoted to various forms of remote electronic communication (i.e. telecommunication) as ever advancing technology and declining costs cause the volume of such communication to rise exponentially. However, no systems are in place to automatically measure and thereby assess how and to what extent members of geographically dispersed organizations use their time and that of others in this important component of the workday.

For years, companies like Nielsen TM have monitored the amount of time that people spend watching TV and now more recently have tracked the amount of time they spend on the Internet. Nevertheless, few if any firms measure the amount of time that employees spend via remote communication in conducting business: on the phone, through e-mail, or videoconference. Today's communications revolution permits work from anywhere at anytime. As the mobility of workers increase, face-to-face interaction declines, and remote communication constitutes an ever-growing percent of interaction with one's colleagues, business partners, suppliers, and customers. For strategic reasons and business performance, it is important to know more about the nature of this communication and its effect on corporate objectives.

To illustrate one application of this invention, an automated, telecommunications-based, time-management system can replace or supplement traditional and more cumbersome activity-based costing (ABC) management systems. As both the percent of knowledge workers within the workforce and the variety of their daily tasks increase, existing activity-based management systems are incapable of adequately tracking the ever-changing nature of their work. No one day is like another, so ABC measures lose their meaning in trying to assign overhead costs to particular customers or products.

Unlike activity-based costing, which requires laborious observation, telecommunication-based costing of activities provides much of the same information at much less cost, in real time, and across organizations: for example, in extended supply chains reaching from the supplier's supplier to the customer's customer. It requires no employee input or training and should be much simpler to implement than activity-based costing, particularly with widely dispersed knowledge workers and executives who handle an ever-changing variety of tasks. Some companies have developed "automated" ABC systems, but the systems still require the users to input data or key in each activity code as it begins.

FIG. 5 of the specification shows a typical automated ABC management system. It is described in detail here as background and referred to again in the specification as an example of how the present invention can be applied to address a specific business problem. In this illustration of the prior art, system 70 of FIG. 5 is used by a business organization that employs people and equipment to provide services or produce products. At the center of the system 70 is a relational database 72 with organized data structures containing raw business data 74 and processed activity-cost information 76. Having access to the relational database 72 are data processing modules 78, including, for example, a people module 80, an equipment module 82, a facility module 84, and an overhead module 86 to process and determine the costs applicable to the activities performed in the organization. There are at least two data input sources to the relational database 72, including automated system inputs from an existing computer system or mainframe 90 through an interface 92. The data automatically imported or downloaded from the existing computer 90 contains general-ledger data 94, production-measurement-system data 96, and human-resources-system data 98. This accounting data may reside on a data storage device in the form of a database.

Another data source to the relational database 72 is user input on a workstation 100 through a graphical user interface (GUI) 102. The type of information entered by the user in this manner may include an identification of employees in specific management organizations, employee-activity information, equipment- and space-utilization information, and product information.

The automated activity-based management system 70 also includes an on-line reporting feature 110, which may generate predefined or user-defined reports on a periodic basis or on demand. Such reports may contain trend, forecast, benchmark, site-comparison, standard-service, activity-output, matrix, quality, and value-added reports.

Traditionally, a business organization makes decisions and strategies based on the general-ledger data 94, production-measurement-system data 96, and human-resources-system data 98 that the organization generates and maintains in the course of its business. The automated activity-based management system 70 takes this traditional accounting information, along with some additional business information provided by the user, and allocates monetary costs to specific activities performed. Whereas a traditional general-ledger view of a computer network's operational business unit maps money spent to salaries, hardware, software, maintenance, and space, an activity-based management view maps these same expenditures to activities previously lumped under the heading of "overhead" such as network surveillance, network testing, technical assistance, problem resolution, vendor interaction, and configuration changes. Activity-based management thus provides a more detailed, realistic, and operational view of how money is spent in an organization. This concludes the detailed descriptive background of the purpose, design, and operation of a typical automated ABC management system.

In addition to improving the accuracy and completeness of automated and non-automated ABC management systems, the present invention can also supplement and improve on job-costing techniques currently used by professionals like lawyers or consultants. These knowledge workers bill their services in as frequent as six-minute intervals, but often must reconstruct at the end of the day how they spent their time. Some may use semi-automated time-tracking software. Such software packages, however, typically measure time usage only for those categories of employees with billable hours and do not indicate the organizational processes and patterns of interactions that consume time.

Traditionally, companies have had outgoing phone logs and may have monitored them to ensure that employees were only making authorized long-distance calls. Today, with digital phone identification, it is now possible to have records of incoming calls, too. As an apparently free resource, e-mail use has skyrocketed, but companies have monitored it primarily to maintain network quality or to control the types of content transmitted. Since the time devoted to telephone calls and e-mail represents a cost to firms, telecommunications use via Internet, wireless-phone, or fixed-line systems should be monitored and analyzed to optimize the amount of time that such use consumes. Managers can manage only what they can measure. This system of time measurement is therefore designed to facilitate better management.

A search of the prior art shows no service or product currently in use for the intended application. The industry for better measuring and managing people's level of attention has not yet developed in business-to-business intranets and extranets, and is in its infancy in the business-to-consumer Internet of online advertising metrics.

BRIEF SUMMARY OF THE INVENTION

The invention provides a new feature and a new use for managing communication-traffic patterns: converting disparate electronic communication forms into a unified time-based measure to illustrate what or who is consuming employees' time and then using this information to improve business processes and organizational strategy.

The invention uses a proxy-server system within an integrated computer-telephone system to intercept, process, and analyze all forms of real- and non-real-time electronic communication passing over the network. The proxy-server system normalizes each electronic communication record into a measure of time—referred to as the "duration" of each record-that is needed by a typical recipient of the communication to process (via a single reading, listening, or viewing) the information that the record contains. The normalization uses variables of communication-record type, format, size, encoding, and word count to derive time measures that are comparable across different communication media. Once normalized, the duration data are aggregated into summary reports, and the aggregated communication records are compared with user-defined rules to provide alerts if groupings or sub-groupings of the aggregated durations exceed boundaries set by the rules. In one embodiment, the summary reports may be integrated with general-ledger data and other raw business data via a relational database to derive more accurate records of activity-cost information. Additionally, the data of the summary reports can be visualized in two- or three-dimensional representations of communication-flow patterns to illustrate in an intuitive and semantically scalable manner the desired level of detail for time and time-based expense consumed by the electronic interactions of an individual or organization.

BRIEF DESCRIPTION OF THE SEVERAL VIEWS OF THE DRAWING

FIG. 3A shows part of a sample log-file containing the information to be captured and the normalizing calculation to be made according to the teachings of the present invention.

FIG. 3B shows three input-output matrices derived from the FIG. 3A data and used to construct the data visualizations of FIG. 6 according to the teachings of the present invention.

FIG. 13 shows an aggregated visualization of internal intra-company and external inter-company communication flows grouped by company-division nodes that have been scaled in size according to user-defined criteria such as number of personnel per division.

DETAILED DESCRIPTION OF THE INVENTION

E-mail, phone, and file-server logs routinely compile statistics in relational database-management systems on the origination, destination, and size (or time) of telecommunications coming to, going from, and circulating within corporate local-area networks. In the present invention, a software program within a proxy-server system filters, collates, aggregates, and converts to a time-based measure this information for each individual within the defined organization. In one embodiment, the software also scans electronic communications for pre-defined subject and key words to allocate time according to specific projects, products, or issues. In another embodiment, the software identifies and sorts communications via the "n-gram approach" of topic spotting or "gisting" described in U.S. Pat. No. 5,418,951 entitled "Method of Retrieving Documents That Concern the Same Topic".

Figure 1:
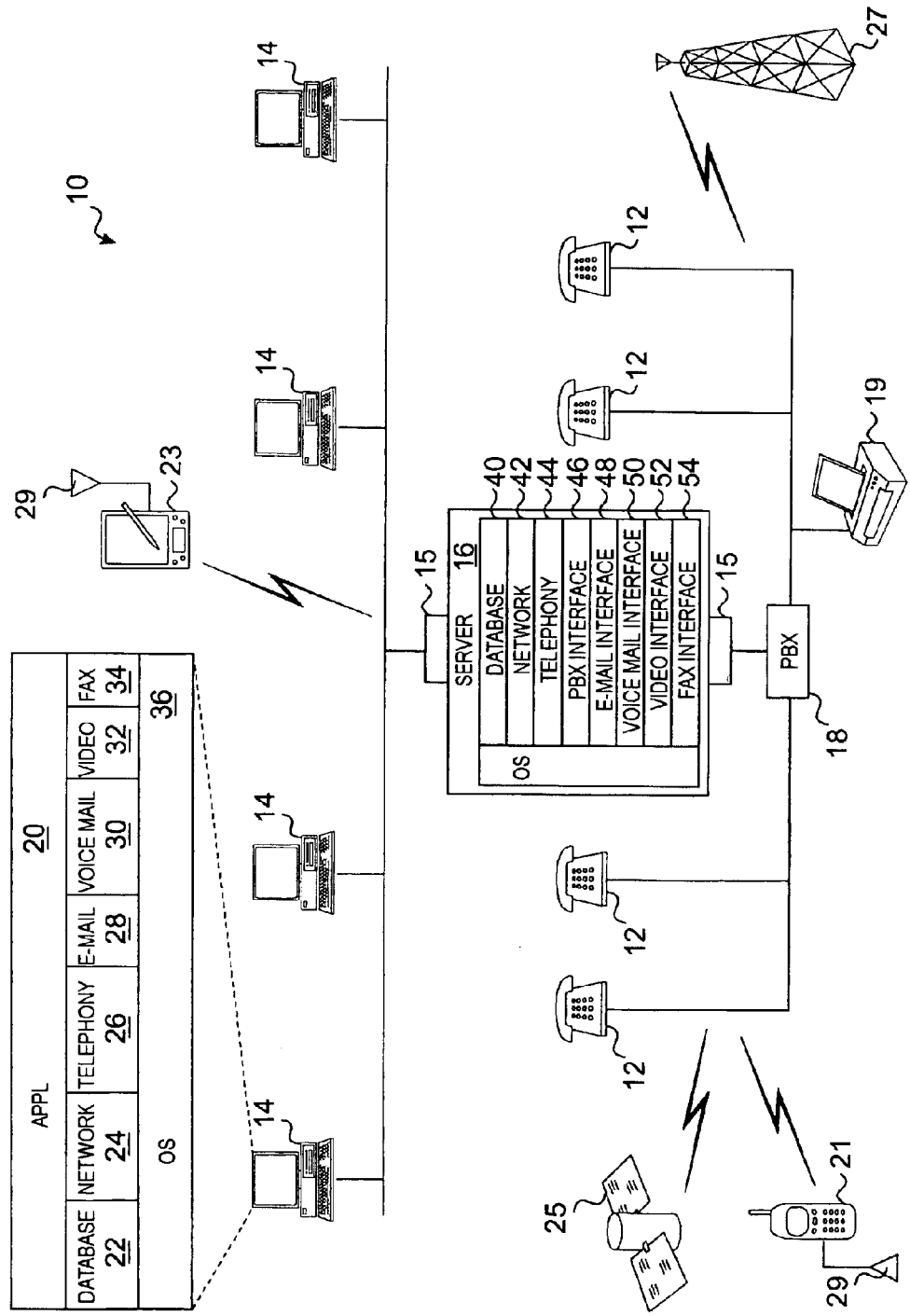
FIG. 1 shows a prior-art computer-telephone system.

FIG. 1 is a prior-art computer-telephone system. The computer-telephone system 10 comprises a plurality of telephones 12, a plurality of client-computer systems 14, a proxy-server system 15, a server-computer system 16, and a Private Branch Exchange (PBX) 18. The computer-telephone system 10 may also include a plurality of direct or remote connections to facsimile systems 19, cellular- and wireless-phone systems 21 and information-appliance systems such as Internet-enabled personal digital assistants 23 communicating by way of conventional digital or analog transmitters/receivers 29, satellite-communication systems 25, or paging and other wireless communication systems 27. Each telephone 12 may be connected to PBX 18. Each client-computer system 14 may be, for example, a general-purpose digital computer such as an IBM-compatible personal computer running the Microsoft DOS operating system and the Microsoft Windows operating environment. Each client-computer system 14 may be connected to server-computer system 16 via proxy-server system 15 using a computer network 17. Computer network 17 may comprise an ethernet or token-ring local-area network or a wide-area network. Server-computer system 16, for example, may be a general-purpose computer that may also comprise a suitable IBM-compatible personal computer. Server-computer system 16 may be connected via proxy-server system 15 to PBX 18. Server-computer system 16 and client-computer system 14 may also be connected via proxy-server system 15 to other systems such as, for example, a voice-mail system (which is not explicitly shown). Proxy-server system 15 may actually comprise several independent hardware servers. Similarly, server-computer system 16 may actually comprise several independent hardware servers, each responsible for providing separate services via proxy-server system 15 to the client-computer system 14. In addition, there may be a plurality of each type of service provided to a client. For example, a single client 14 may be serviced via proxy-server system 15 by more than one database server, central-office telephone line, E-mail system, or PBX. For example, a single hardware-server system may be dedicated to providing access to PBX 18 while a separate server computer is dedicated to providing database services to client-computer system 14. In addition, server-computer system 16 via proxy-server system 15 may act as a gateway to remote systems such as mainframe or other database-storage systems connected to proxy-server system 15 and server-computer system 16 through, for example, a wide-area network.

A client-computer system 14 may serve as a hardware platform to run, for example, one or more application programs 20, one or more client-service providers 22 through 34 and an operating system 36. Applications 20 may provide various services to a user using client-service providers 22 through 34. Each of the client-service providers 22 through 34 may access internal or external hardware and software through operating system 36 to provide services to applications 20.

The embodiment illustrated in FIG. 1 gives several examples of client-service providers that may be used with computer-telephone system 10. Other client-service providers may also be used. Client-service providers 22 through 34 may include database client-service provider 22, network client-service provider 24, telephony client-service provider 26, e-mail client-service provider 28, voice-mail client-service provider 30, video client-service provider 32 and fax client-service provider 34.

Similarly, server-computer system 16 may comprise operating system 38 and server-service providers 40 through 54. Server-service providers 40 through 54 may interact with client-computer system 14 to provide services to client-computer system 14. Server-service providers 40 through 54 may also interact with other internal or external hardware or software such as PBX 18 to aid in providing services to client-computer system 14. Server service providers 40 through 54 may use operating system 38 to interface with client-computer system 14 and PBX 18. As shown in FIG. 1, server-service providers 40 through 54 include database server-service provider 40, network server-service provider 42, telephony-server service provider 44, PBX-interface server-service provider 46, e-mail-interface server-service provider 48, voice-mail-interface server-service provider 50, video-interface server-service provider 52, and fax-interface server service provider 54.

Figure 2:
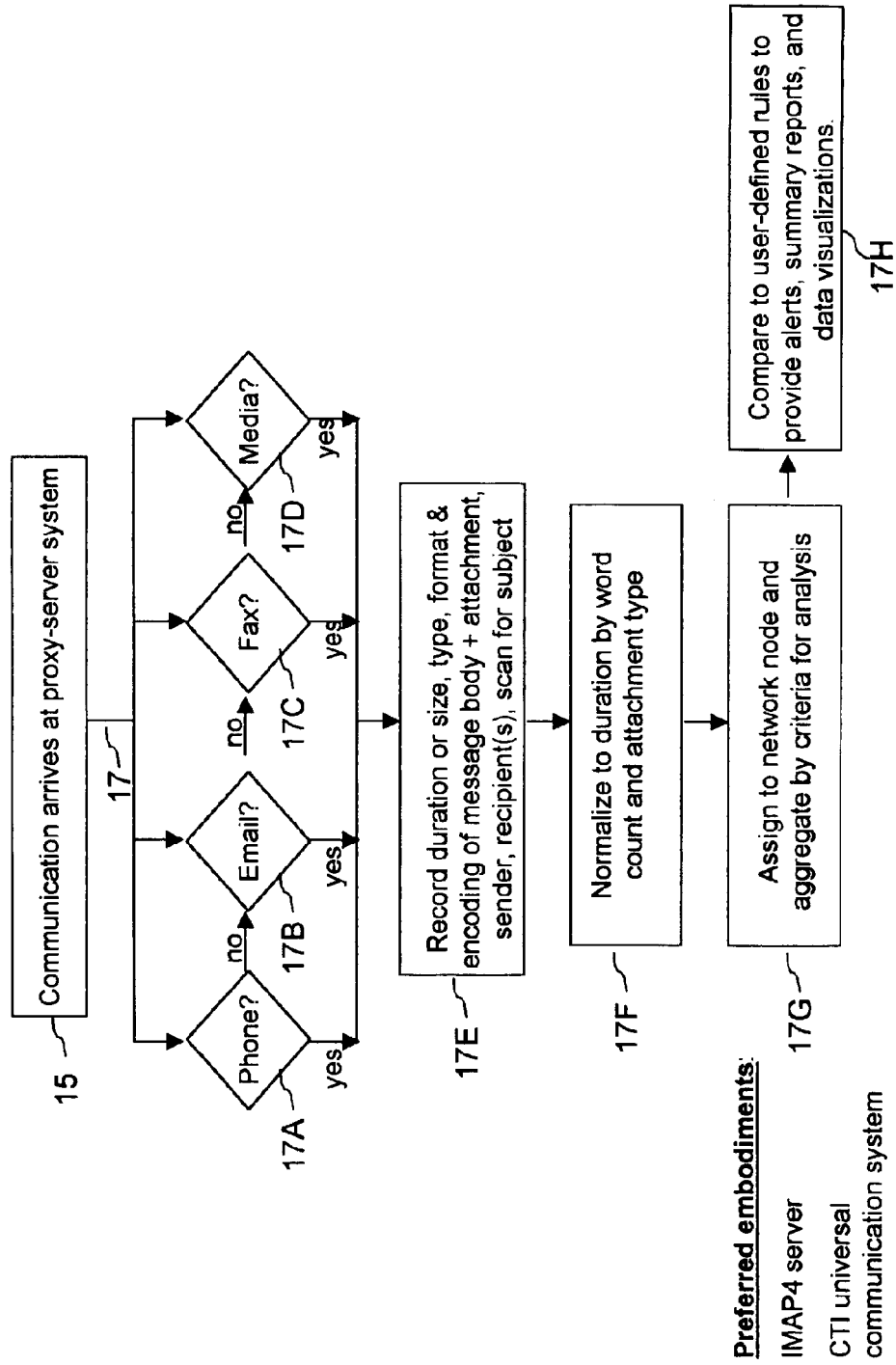
FIG. 2 is a simplified flow diagram for the handling of real-time communication and non-real-time messaging according to the teachings of the present invention.

FIG. 2 is a simplified flow diagram for the handling of real-time communication and non-real-time messaging according to the teachings of the present invention. Once the electronic communication arrives at the proxy-server system 15, the proxy-server system determines the message type for processing 17 and examines whether the communication is of phone 17A, e-mail 17B, fax 17C, or some other media 17D. In the embodiment of FIG. 1, the proxy-server system handles unified communications via a system of computer-telephony integration (CTI) with centralized and synchronized storage of messages through, by way of example, Internet Message Access Protocol, version 4 (IMAP4). Those skilled in the art will also recognize methods for handling and then aggregating according to the present invention those communications that come over non-integrated systems such as legacy phone networks. In step 17E, the proxy-server system 15 records the duration, identity of participants, and subject matter of the real-time communication. To identify subject matter, the proxy-server system may use word spotting or prompt the initiator of the communication for an identification code such as a project number, name, or subject. For non-real-time messages in step 17E, the proxy-server system records the size, type, and format of both the message body and attachment as well as the manner of encoding (whether the attachment and message body have been compressed or encrypted), the identity of the communicating parties, manner of transmission (whether direct, forwarded, carbon copy, or blind carbon copy) and the message subject.

Based on the message and attachment type, format, and manner of encoding, the proxy-server system 15 employs one of a plurality of algorithms 17F to convert the message size and word count into a normalized measure of duration—the time needed by each recipient to open, understand, and dispose of the contents of the communication via a single reading, listening, or viewing. FIG. 3A below provides examples of different algorithms 17F that may be used to convert various message types to durations. A message type such as a phone or video communication, which is already in a time-based format and hence has a duration associated with it, does not need to undergo some of the steps of the normalizing conversion to a duration; whereas text- or image-based messages and attachments do need conversion into time-based measures. Regardless of communication type, a time-factor for opening and disposing of the communication is added to each duration as part of the algorithms 17F.

In step 17G of FIG. 2, the proxy server 15 then assigns the duration data from the normalizing algorithms 17F to a network node in a relational database management system for subsequent aggregation and analysis. As part of the analysis, the aggregated communication records are compared with user-defined rules 17H to provide alerts if the individual or aggregated durations exceed boundaries set by the rules and to generate summary reports and data visualizations, as described below. User-defined rules, by way of example, may include the setting of maximum and minimum thresholds for the aggregated time spent during a specified time period by a designated group within the organization in communicating electronically with a particular customer or supplier.

FIG. 3A shows, by way of example, part of a sample log-file 31 containing elements of the information to be captured and the results of the normalizing calculation to be made according to the teachings of the present invention. The sample log file contains rows of individual communication records such as communication records 33 and 35, described below. The sample log file also consists of columns for date 31A and time 31B of each communication record, identity of the recipient of the communication record 31C (shown in the format of an e-mail address or other directory format), manner of communication 31D (whether direct, via carbon copy—cc, blind carbon copy—bcc, or forwarded—fw), sender of the communication record 31E (in a similar format as recipient 31C), subject key words 31F, message type 31G and attachment type 31H of the communication record with size measured in kilobytes—kb and with "n/a" indicating no attachment, message size 31I and attachment size 31J of the communication record, message word count 31K and attachment word count 31L of the communication record, and the normalized duration 31M of each communication record, showing the time needed for a typical recipient to open, understand, and dispose of the communication record via a single reading, listening, or viewing. The communication record includes both the message body and any attachment(s) to that main body. Summing the rows of column 31M yields the total duration 31N for the period of interest in the sample log file.

Subject key words 31J are derived, in one embodiment, from matching automatically scanned or transcribed text from the communication record via a process of topic detection with a pre-defined list of key words related to, for example, specific customers, projects, products, or issues that the proxy-server system 15 has been programmed to recognize. Those skilled in the art will realize that alternative methods of topic spotting or gisting also exist for determining an undefined subject-matter context via the location and frequency of bi-grams of 2 words or n-grams of n words in the text of the communication record.

Communication records may contain multiple subject key words of interest. In such instances, the normalizing calculation of the proxy-server system 15 assigns a percentage of the communication record's total duration to each key word according to the key word's relative frequency in the record.

The communication record 33 in the sample log file 31 illustrates, by way of example, the information collected to derive a normalized duration 31M for aggregation into a total duration 31N. At 14:52 Eastern Standard Time (EST) on Jan. 18, 2000, the sender jayang@ sent a fax with no attachment on subject "re: prototype" to pulrich@ with a carbon copy to porondo@. The fax message size 31I of 132 kilobytes contains a word count 31K of 550 words, derived via, by way of example, the means of optical character recognition or by means of statistical averages of word-to-byte ratios for the particular message type, format, and encoding represented by that communication record. A normalizing calculation then converts the number of words 31K and 31L into a duration 31M based on typical word-per-minute reading speeds plus a time factor for viewing non-text data such as images or diagrams in the communication as well as typical times needed to open and dispose of that form of message upon receipt.

Communication record 35 shows another example of a communication record—in this instance, a phone call of personal nature lasting 1.6 minutes. No normalizing calculation is required as the message type is already in a time-based format while the time needed to receive and dispose of the communication consists of a relatively insignificant few seconds needed to pick up and set down a phone receiver.

Figure 6:
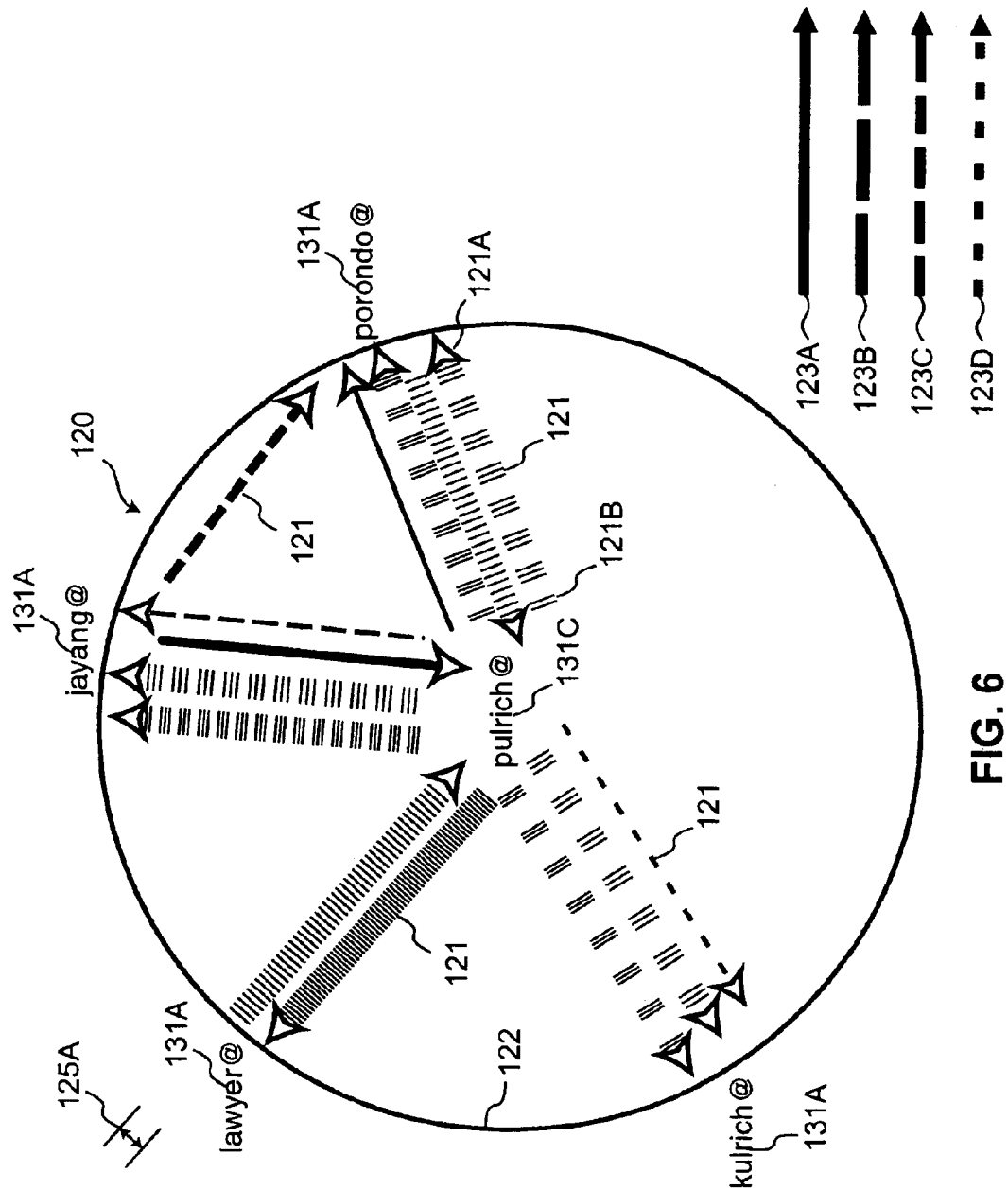
FIG. 6 shows a simplified two-dimensional visual encoding of the data from FIG. 3A and FIG. 3B.

FIG. 3B shows, by way of example, three input-output matrices of minutes of time 41 derived from the FIG. 3A data and used to construct the data visualization of FIG. 6 according to the teachings of the present invention. By way of illustration, durations of electronic communications between individuals can be aggregated by subject matter matrix 41A, date matrix 41B, or period matrix 41C. Each cell of the matrix shows the minutes of electronic-communication time required by sender 31E of recipient 31C for the criteria of aggregation, which in this example are subject, date, and period. The time and attention of the recipients of communications 31C are being demanded by the senders of those communications 31E—hence, the notation of "by/of" in the first cell 47 of each matrix. Ordinarily, a sender would not be a recipient of his own communication, so the diagonal cells of each matrix show "n/a". Subtotals 43A, 43B, and 43C illustrate that the minutes of time demanded along the rows of each matrix equal the minutes supplied along the columns. Matrix 41C summarizes the entire sample log file 31, so that subtotal 43C equates to total duration 31N. End rows and end columns 45A, 45B, and 45C show the percentage shares of the total electronic-communication time demanded or supplied for each row and column of the matrices.

For the sake of consistency, all time is measured from the perspective of the recipient of the communication record. The model does not note whether it takes a sender 50 seconds or 50 minutes to write an e-mail that is circulated to recipients, but rather normalizes and aggregates according to how long it takes, on average, for recipients individually and collectively to open, read once, and dispose of the record. The length of time that the communication remains on a recipient's computer—either visible on the reception device's screen or in a storage archive, or whether a recipient might return to the communication at a later time to review it, are also not factors in the normalization. Although an approximation, the normalizing calculation seeks to maximize the probability that its calculated duration actually describes the time devoted by a recipient to a given communication record. It does this by minimizing the variance likely to be associated with the time involved in processing a particular communication. The variance of a recipient's time to read and understand a communication is usually much less than that of the sender whose effort to compose a message of a particular word count might vary from seconds to hours depending on the nature of the message: a rapidly typed 100-word e-mail note could require a small fraction of the time needed for a 100-word e-mail containing a marketing slogan or software program composed by the sender.

Figure 4:
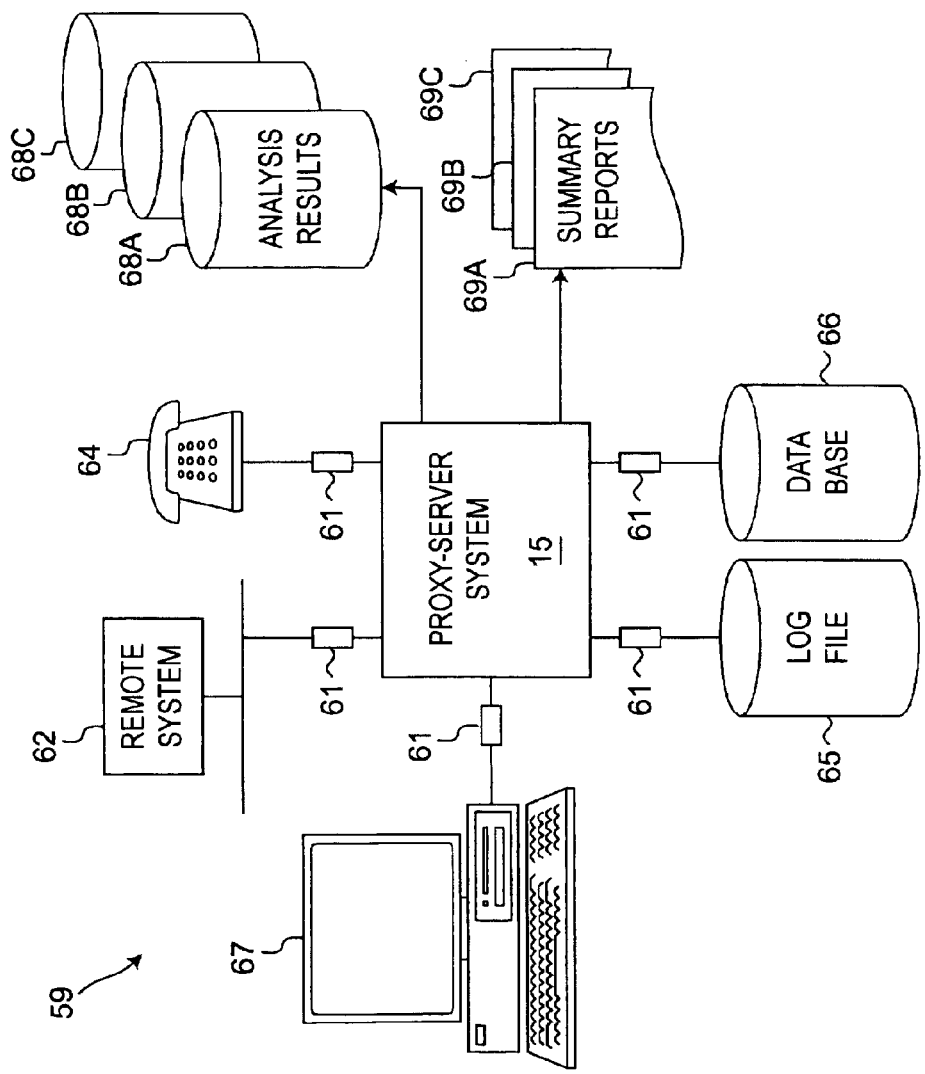
FIG. 4 illustrates a prior-art method for analyzing communication-traffic data in a distributed-computing environment using the computer-telephone system of FIG. 1.

FIG. 4 illustrates a prior-art method for analyzing communication-traffic data in a distributed-computing environment 59 using the computer-telephone system of FIG. 1. The proxy-server system 15, described in FIG. 1 provides Web site and related services to remote users. By way of example, the remote users may access the proxy-server system 15 from a remote-computer system 62 interconnected with the proxy-server system 15 over a network connection 63, such as the Internet or an intranet, a dial-up (or point-to-point) connection 64 or a direct (dedicated) extranet connection 67. Other types of remote-access connections are also possible.

Each communication by a remote user via the proxy-server system 15 results in a record of raw traffic data 61. The format used in storing each traffic-data record 61 and examples of traffic-data records 61 were described in FIG. 3A above. The proxy-server system 15 preferably stores each traffic-data record 61 in a log file 65, although a database 66 or other storage structure may be used.

To analyze the traffic data, the proxy-server system 15 examines each traffic-data record 61 and stores the communication information obtained from the traffic-analysis results as 68A–C. An example of one form of traffic analysis results was described in FIG. 2 above. Five sources of traffic data 61 (remote system 62, dial-up connection 64, log file 65, database 66, and direct connection 67) are shown. Other sources are also possible. The traffic-data records 61 can originate from any single source or a combination of these sources. While the proxy-server system 60 receives traffic-data records 61 continuously, separate sets of analysis results 68A–C are stored for each discrete reporting period, called a time slice. The analysis results 68A–C are used for generating summary reports 69A–C of the communication information.

In the described embodiment, the proxy-server system 60 is typically an Intel Pentium-based computer system equipped with a processor, memory, input/output interfaces, a network interface, a secondary storage device and a user interface, preferably such as a keyboard and display. The proxy-server system 60 typically operates under the control of either the Microsoft Windows NT or Unix operating systems and executes either Microsoft Exchange Server or IBM Lotus Notes server-messaging software. Pentium Microsoft, Windows, Windows NT, Unix, IBM, and Lotus Notes are trademarks of their respective owners. However, other proxy-server system 60 configurations varying in hardware, such as DOS-compatible, Apple Macintosh, Sun Workstation, and other platforms, in operating systems, such as MS-DOS, Unix, and and MS-DOS are trademarks of their respective owners.

Figure 5:
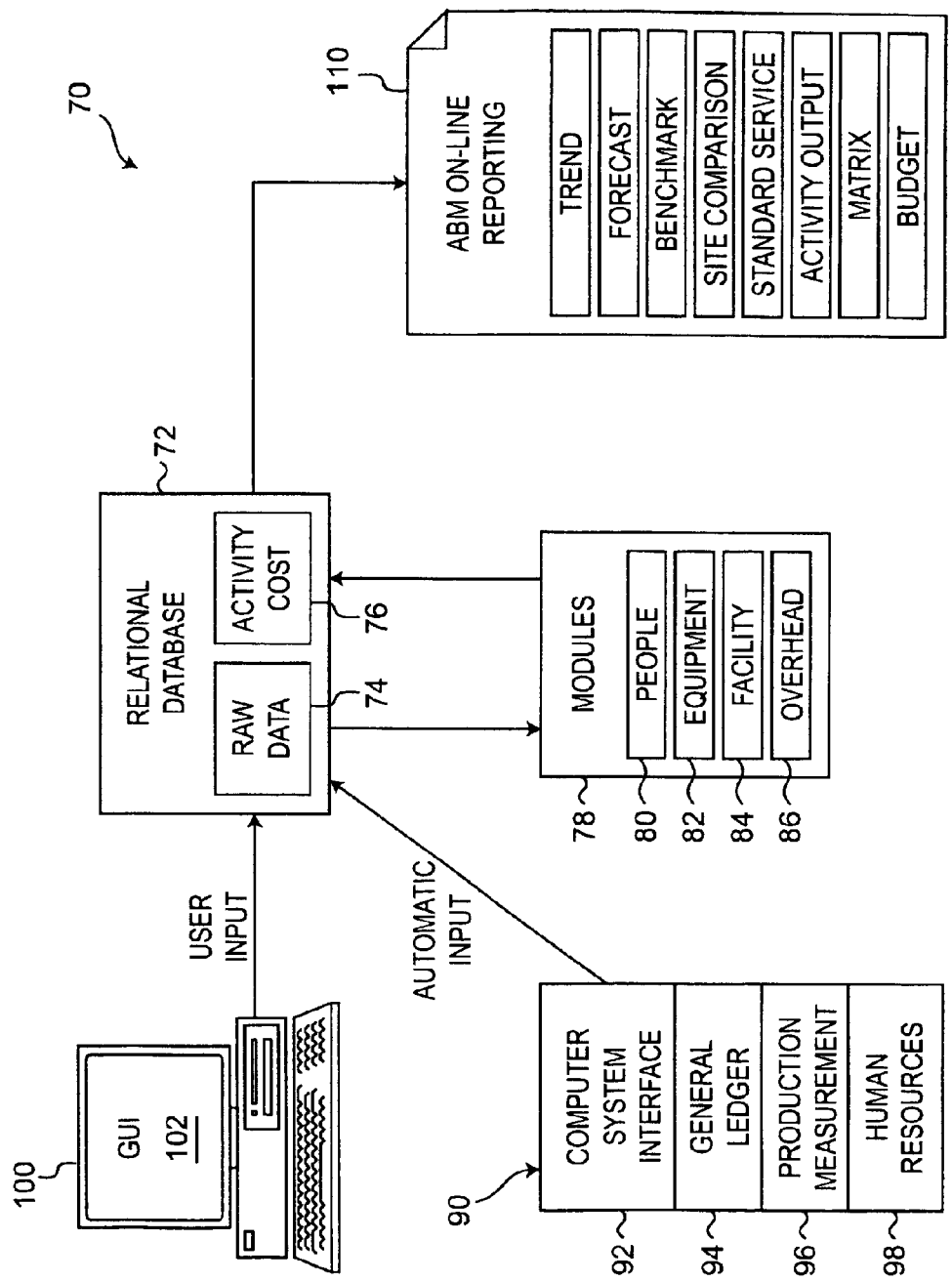
FIG. 5 shows a prior-art embodiment of an automated activity-based-costing management system.

FIG. 5 shows a prior-art example of an automated activity-based-costing (ABC) management system. The information captured and analyzed according to the present invention may be used in such a system to improve the accuracy and completeness of its measurements for allocating costs. The ABC time attributed to knowledge workers and executives in typical systems like that of FIG. 5 is allocated arbitrarily via subjective estimation by these persons as to the amount of time they spend on specific customers, products, and market channels. However, the present invention tracks the time that such knowledge workers and executives spend communicating electronically on these ABC items, thereby providing an objective, heuristic measure of how best to allocate their ABC time for computing activity-based costs. Moreover, unlike the prior art of FIG. 5, the invention does not require input from users but captures automatically the ABC information from the users' electronic communications related to particular ABC items of customers, products, and market channels.

Figure 14:
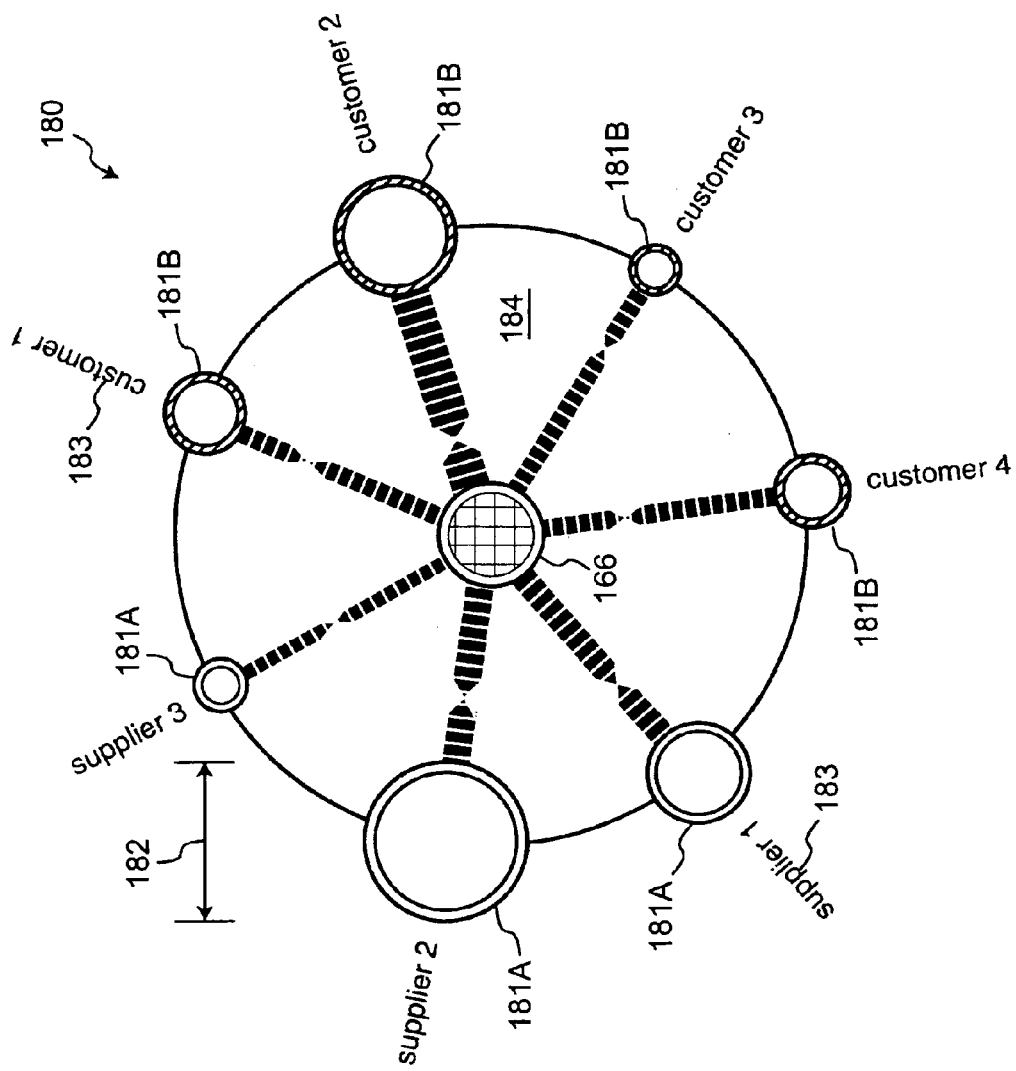
FIG. 14 shows an aggregated visualization of external inter-company communication flows with external company nodes scaled in size according to a user-defined criteria such as volume of annual financial transactions.

As illustrated in FIG. 14 below, a software program within the proxy-server system 15 of FIG. 4 integrates with financial accounts of the general ledger 94 of FIG. 5 to chart the total times spent in telecommunication with particularly important customers, suppliers, channel partners, or others in the company's extended network of contacts. This diagnostic tool compares time spent in aggregate by various corporate individuals (valued by the opportunity cost of those individuals' time) with the financial value of business transacted or other financially defined objectives.

A normalizing algorithm converts each form of telecommunication into measures of time needed by an individual to process the information contained in the communication. For voice and video, there should be a fairly stable relation between the amount of kilobytes or megabytes, respectively, equal to one minute of the listener's or viewer's time. For text, the algorithm normalizes by average reading speeds of, for instance, 200 words per minute and by a constant bytes-to-word ratio for particular file formats and encodings. For pure data files, the normalization is more complex. Except for telemetric applications where machines would be expected to churn through all the data received, human recipients would not generally comb through vast data files but might only scan the initial sections, depending on the overall size. By way of example, for a given data file format and encoding, the number of megabytes in size for a very large data file might be divided by 100 in converting to a text equivalent measure while the size of a big file might be divided by ten, and that of a small file by two. For images of a particular file format and encoding, normalization would be based on averages of, for instance, ten seconds per 100 kilobytes.

The intent of the normalization is to give a rough order of magnitude—not an exact measure—of the time needed by individuals (or machines) to process information from various sources and via differing electronic-communications media. Users of the present invention can also employ automatic time-tracking software packages to measure actual times spent opening and reading e-mail and file attachments. Such measurements can build a baseline database of empirical statistics for verifying and adjusting the normalization parameters. Once aggregated and assigned to specific nodes according to subject-matter criteria of interest, as was shown in FIG. 2, the normalized times provide a heuristic measure of who and what is consuming time and whether those demands on time are in line with organizational priorities.

By way of example, FIG. 6 shows a simplified two-dimensional visualization 120 of the data from FIG. 3A and FIG. 3B. In FIG. 6, arrows 121 represent the directional flow of an individual communication between two or more nodes 131A and 131B, corresponding, in this example, to individual persons figuratively arranged in a preferred embodiment of circular ring 122 around a central node of interest 131C and symbolized as labels by the first part of each individual's e-mail addresses. Arrowheads 121A point to recipients of electronic communication originating from senders at the node of the arrow base 121B. Solid arrow lines 123A indicate a direct electronic communication while long-, medium-, and short-dashed arrow lines 123B, 123C, and 123D indicate a carbon copy, blind carbon copy, or forwarded copy, respectively, of an original electronic communication. The width 125A of each arrow corresponds to the normalized duration of the electronic communication while the variation in the arrow's depth of gray-scale shading or hatching pattern is intended to help distinguish different arrow groups from one another. Alternatively, arrows may be distinguished via colors on a heat scale, ranging from, for example, warm reddish colors to cool bluish colors, with the heat scale corresponding to an additional attribute of interest.

Figure 7:
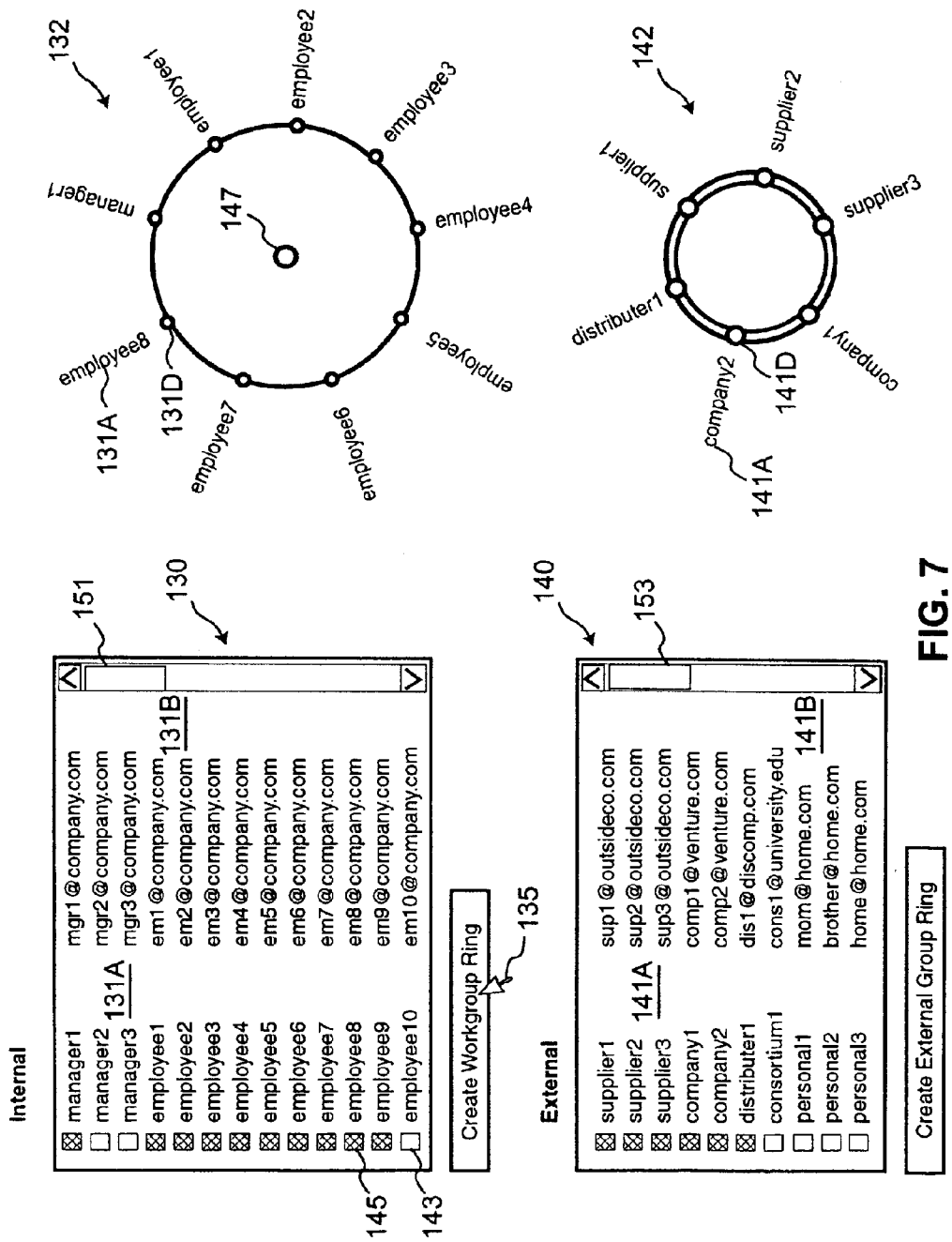
FIG. 7 shows a method for creating an internal, intra-company visualization ring and an external, inter-company visualization ring using database directories derived from internal and external e-mail messages.

FIG. 7 shows, by way of example, a method for creating an internal, intra-company visualization ring 132 and an external, inter-company visualization ring 142 from database directories 130 and 140 derived from internal and external email messages Each e-mail address 131B and 141B of e-mail senders and recipients is associated with, and adjacent to, a label 131A and 141B. The labels in turn are ordered alphabetically or by other means within database directories 130 and 140.

Figure 9:
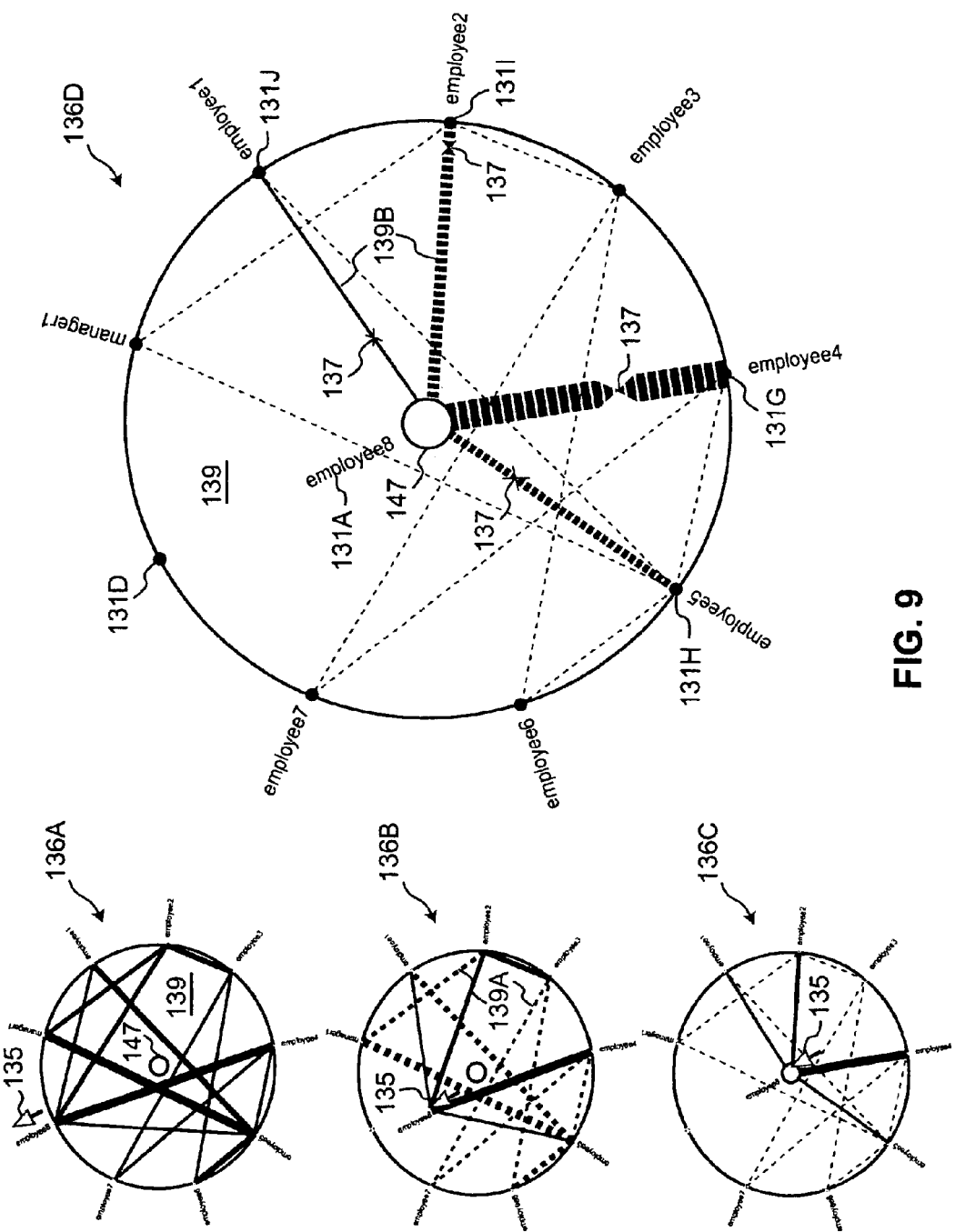
FIG. 9 shows the aggregated communication flows for a single employee node within the intra-company ring of FIG. 7 and FIG. 8.

Intra-company ring 132 is arranged around a central node 147, whose function is illustrated in FIG. 9 below. Messages that both originate from, and are sent to, the company's domain name are categorized as internal. In a preferred embodiment, database directories 130 and 140 would include records from other forms of communication stored via phone, fax, Web, and instant-messaging servers. In the illustrated embodiment, the user of the telecommunications-based, time-management system uses the cursor 135 to scroll along side bars 151 and 153 before clicking on and selecting the individual label records 131A and 141A for creating the visualization rings 132 and 142, made up of the labels 131A and 141A and corresponding nodes 131D and 141D, respectively. In another embodiment, this selection may be done automatically. Once selected, an open check box 143 next to an individual label record 131A or 141A of database directories 130 and 140 changes in color, by way of example as in the illustrated embodiment, to the filled-in check box 145 to show that the adjacent individual record has been selected for inclusion in the visualization ring 132 or 142.

Since each person might communicate electronically with hundreds, if not thousands, of others over the course of a year, automatic filters may, for example, create visualization rings 132 and 142 only from the most frequently contacted communicants for the defined node level (whether it be an individual, a work group, or the entire company) and period of interest.

Figure 8:
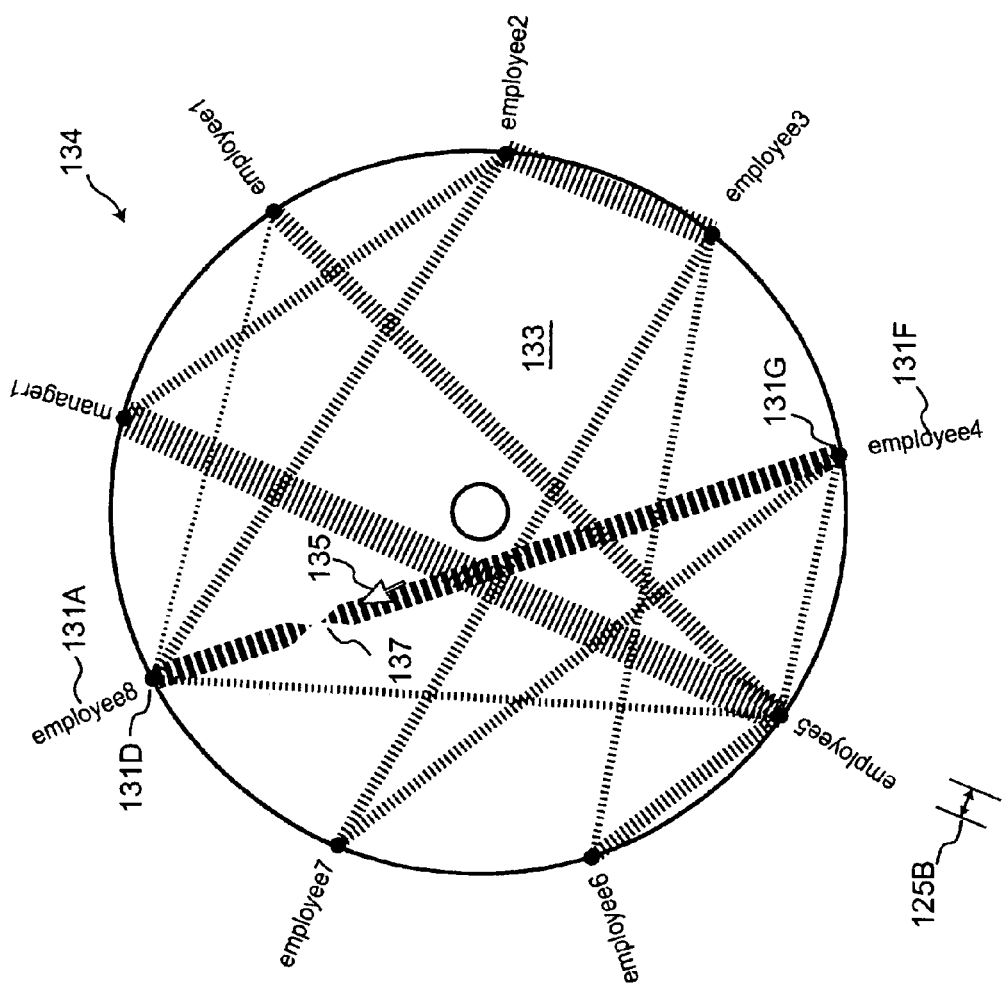
FIG. 8 shows an aggregated visualization of the communication flows for the internal intra-company ring of FIG. 7.

FIG. 8 through FIG. 12 show how a graphical and interactive user interface may be used to map a bird's eye view of the directional flows with the option of "semantic" zooming in or out for closer or broader looks at particular attributes of interest. The visualization may be in two or three dimensions. In FIG. 8, visualization ring 134 semantically magnifies the view of internal ring 132 of FIG. 7 to show communication flows 133 between each pair of nodes. FIG. 8 follows a similar schematic pattern as that of FIG. 6. However, in aggregating communications between nodes, FIG. 8 uses the width 125B of each communication-flow line 133 between nodes to correspond to the total aggregated duration of electronic communication flowing in both directions. For more detail on the balance of communication between nodes, the user may point the cursor 135 over the line between any pair of nodes to bring up the relative amounts of communication moving in either direction. The relative distance in the location of the junction of arrowheads 137 from the nodes 131D and 131E illustrates the corresponding share of the total communication between the two entities (represented by the labels of the two nodes 131A and 131B) that each entity originates.

FIG. 9 shows, by way of example, the aggregated communication flows for a single employee node label 131A within the intra-company ring of FIG. 7 and FIG. 8. The four visualization rings 136A–D illustrate how the user may click and drag the employee node of interest 131D with the cursor 135 from the perimeter to the center of the visualization ring 147. In so doing, communication lines 139A not connecting to the node 131D fade into the background as shown in rings 136B–D. Once the label 131A of node 131D reaches the center of the visualization ring as in 136D, the details of communication patterns 137 of communication flows 139B between node 131D and nodes 131G–J with which it communicates emerge within the enlarged ring.

Figure 10:
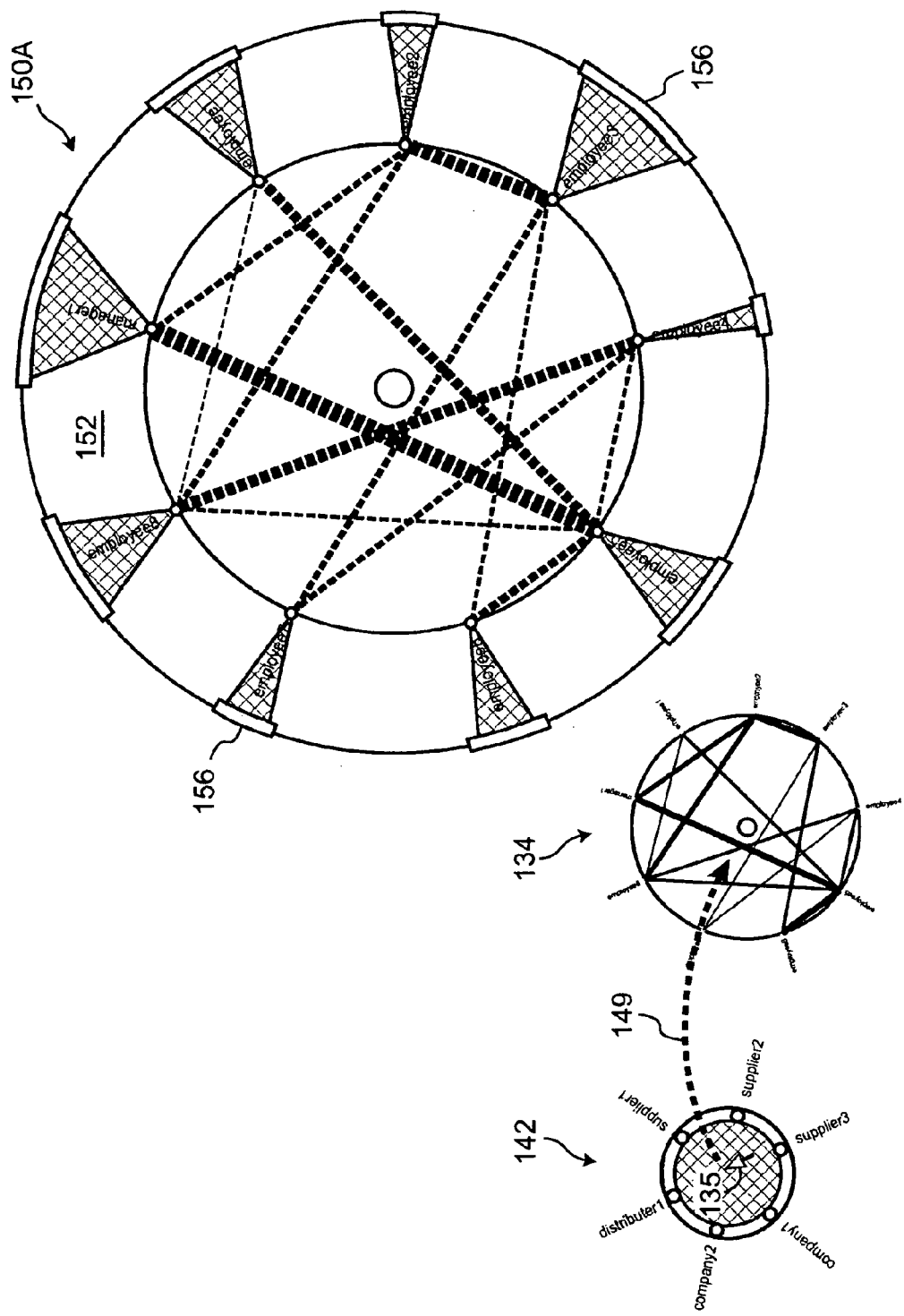
FIG. 10 shows an aggregated visualization of the communication flows between the intra-company ring and the inter-company ring of FIG. 7.

FIG. 10 shows, by way of example, an aggregated visualization of the communication flows between the internal, intra-company ring and the external inter-company ring of FIG. 7. By clicking and dragging (as symbolized by curved and dotted arrow 149) with cursor 135 the external ring 142 onto the internal ring 134, the user creates the concentric ring pattern 150A showing visualizations of communication flows 152 between nodes of the internal ring 134 and the particular external ring of interest 142. The lengths of the arcs 156, in a fashion analogous to that used by the width of the lines of FIG. 8, illustrate the volume of communication between the nodes of interest. Concentric ring patterns 150A–C in FIGS. 10–12 illustrate examples of different types of visualizations and areas of emphasis that may be created within the concentric framework.

Figure 11:
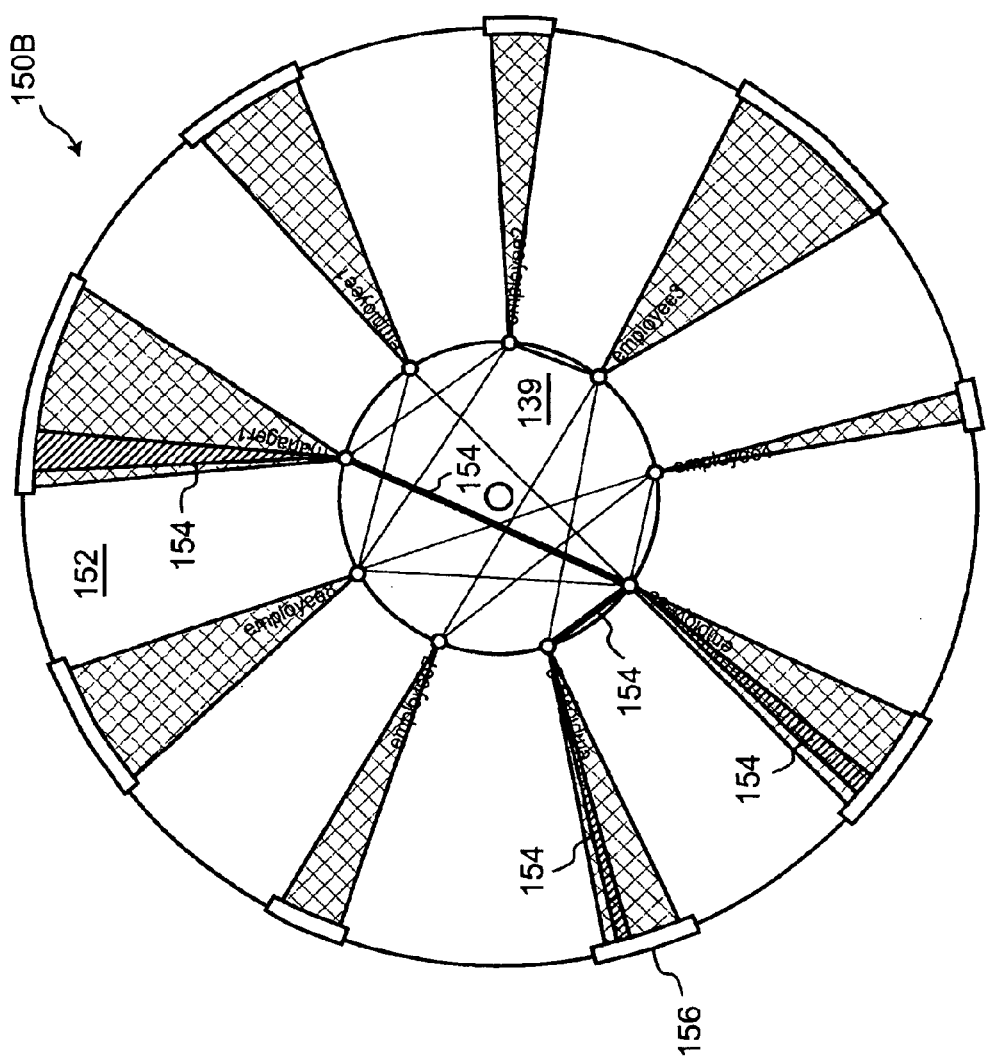
FIG. 11 shows a visualization of the communication flows on a particular subject between the intra-company ring and the inter-company ring of FIG. 10.

FIG. 11 shows, by way of example, a visualization of the communication flows on a particular subject between the intra-company ring 134 and the inter-company ring 142 of FIG. 10. The volume and directional flows on the subject of interest are highlighted by 154 in a separate color or different shading on a gray-scale to differentiate them from the other external communications 152 and internal communications 139.

Figure 12:
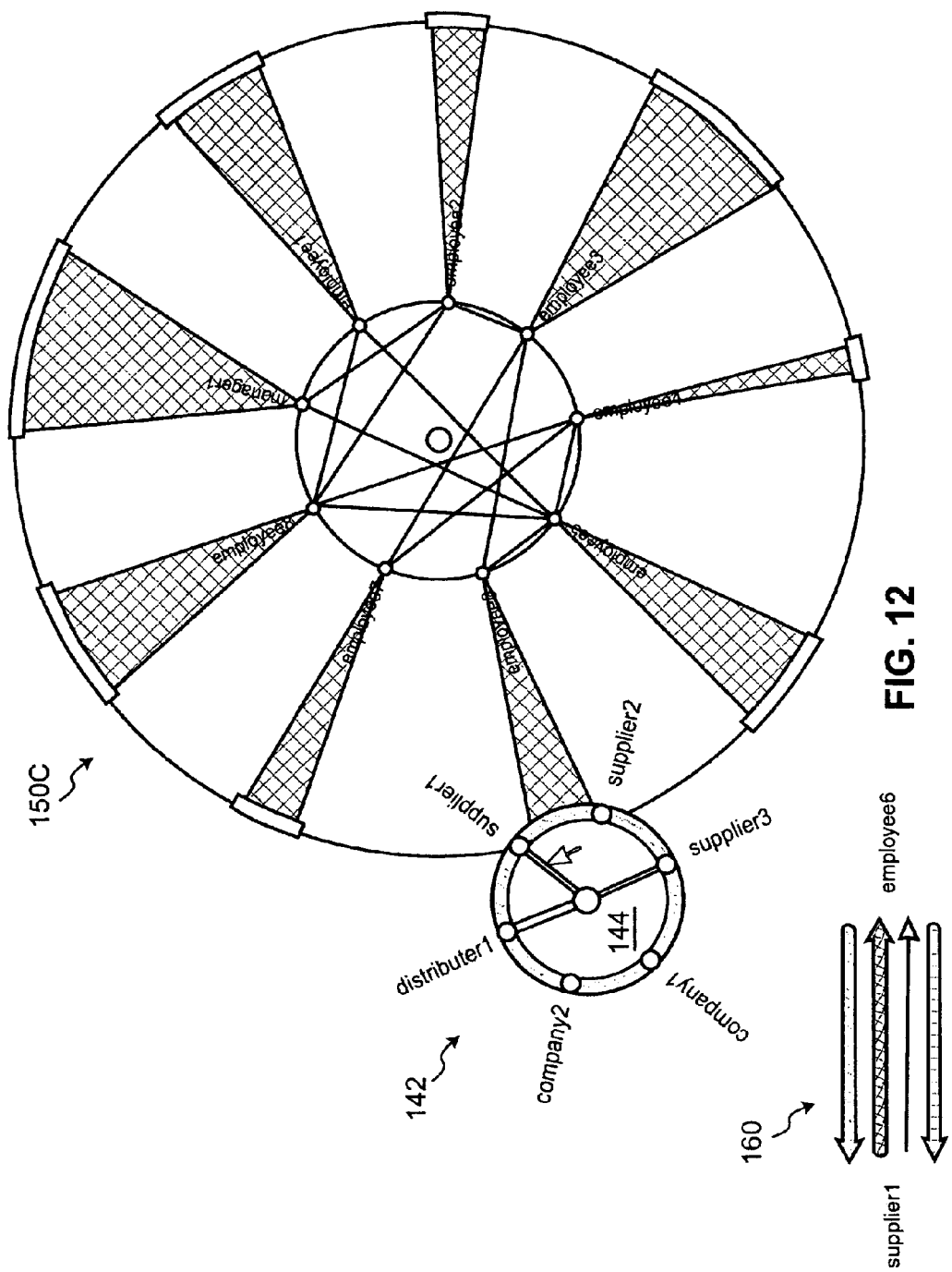
FIG. 12 shows a partially disaggregated visualization of the details for communication flows between a single employee node and the nodes comprising the external inter-company ring.

FIG. 12 shows, by way of example, a partially disaggregated visualization of the details for communication flows between a single employee node on the concentric ring 150C and the nodes comprising the external inter-company ring 142. By using the cursor 135 to click on the arc 156 of FIG. 11, the user can visualize the details of communication patterns 144 between the internal employee node of interest and the external ring 142. Clicking with the cursor on any one of the lines 144 will bring up further details 160, disaggregated by message or other refined criteria, as was demonstrated in FIG. 6.

FIG. 13 shows, by way of example, an aggregated visualization of internal intra-company and external inter-company communication flows grouped by company-division nodes 163A–D, with labels 164 that have been scaled in size according to user-defined criteria. The ring 160 shows internal communication patterns in a fashion analogous to that of FIG. 8, with the juncture 167 illustrating the relative balance in communication between two nodes of interest, here illustrated by nodes 163D and 163B. In this example, the node diameters 162 are scaled to reflect the relative size of each division, according to criteria of interest such as annual revenues or headcount. Superimposing external ring 142 of FIG. 7 on ring 160 creates concentric rings 170 with the relative size of communication volumes between company-division nodes and the external ring shown by the relative sizes of wedges 172.

FIG. 14 shows, by way of example, an aggregated visualization of external inter-company communication flows with external company nodes 181A and 181B that have been scaled in diameter size 182 according to user-defined criteria such as volume of annual financial transactions and shaded in color or gray scale according to the type of node—whether, for example, a supplier or customer, represented by the difference between supplier nodes 181A and customer nodes 181B, with their respective labels 183. The ring 180 shows an alternate representation of concentric rings 150A, in which, after superimposing external ring 142 of FIG. 7 onto internal ring 132 or 160 (defined by employee and division node, respectively), the internal ring 142 has been semantically reduced to ring 166 to show greater external communication detail 184 between the internal ring 166, viewed in aggregate, and each external node, appropriately scaled.

CONCLUSION, RAMIFICATIONS, AND SCOPE

While the above description of the preferred embodiment contains many details, these should not be construed as limitations on the scope of the invention, but rather as an exemplification of one preferred embodiment. Many other variations are possible. For example, the invention may function at several levels—for any or all of organizational intranets, extranets, and the public Internet. In this context and in previous and subsequent usage, "organization" refers to all forms of business and not-for-profit public or private entities.

Intranets:

For intranets, the telecommunications-based, time-management system measures and maps the volume, directional flows, and reception of media messages by employees of an organization according to the content of the subject matter. Such a system can be used to analyze questions of organizational behavior such as:

What are the patterns of information flows—who is in and out of the informational "loop"?

What are the value of flows?—what percent of e-mail sent by an individual in the organization is opened, read, and processed (as measured by the time opened to file size), forwarded to others with and without comments, and replied to?

Those skilled in the art and familiar with (junk) e-mail advertising campaigns will recognize that HTML-formatted e-mail with HTML links inside or with invisible 1-by-1 pixel SYNC.GIF file tags known as "Clear GIFs" or "Web bugs" enable the server computer to collect remotely much of this information on the opening and forwarding of e-mail from the client computer. A Web bug is a graphic image tag on a Web page or in an e-mail message and is used to monitor who is reading the Web page or e-mail message. Web bugs are often invisible because they are typically only 1-by-1 pixels in size. They are represented as HTML IMG tags. When a Web bug is viewed, the following information is sent out and can be collected for analysis:

1. The IP address of the computer that fetched the Web bug
2. The URL of the page that the Web bug is located on
3. The URL of the Web bug image
4. The time the Web bug was viewed
5. The type of browser that fetched the Web bug image
6. A previously set cookie value Apart from its uses in tracking online visitors to a Web site, a Web bug can be used to find out if a particular e-mail message has been read by someone and if so, when the message was read. A Web bug can also provide the IP address of the recipient if the recipient is attempting to remain anonymous. Moreover, within an organization, a Web bug can give an idea of how often a message is being forwarded and read.

Some of this functionality requires the distribution and deployment of software on client machines to capture data on messages stored at the client for forwarding to a centralized proxy server for subsequent processing, aggregation, and analysis. However, much of the monitoring can be done remotely via Web bugs, as is becoming common in commercial business-to-consumer transactions.

Financial analysts and companies like Media Metrix TM value Internet properties by page views and time spent online at the site. Others use hyperlinks to a site as a proxy for traffic and popularity. The same can be done for an individual's contribution to, or detraction from, a company's internal communication channels. As each individual's publications are stored as Web pages on corporate intranets, entire documents or individual pages can receive scores for the amount of downloads that they receive. Some organizations have already proposed such uses of their products although not necessarily for the basis of an objective analysis of individuals' contribution to the organization.

This kind of monitoring system illuminates those who send "point—click—delete" messages that waste people's time versus the ones who have valuable contributions to make—i.e. that others open, read, re-read, and comment on. Junk e-mail or "spam" from advertisers is widely condemned. However, less offensive, but no less time-wasting, intra-organizational "spam" circulates in offices-needless reminders, jokes, or announcements that could be best retrieved via pull-systems on corporate intranet Web sites rather than being pushed into users' inboxes. "Pull" refers to transmissions initiated by the receiver, like the HTTP Get operation; whereas "push" describes transmissions initiated by the sender such as the sending of e-mail. From an economic perspective, unsolicited and unwanted corporate communication creates a negative externality that businesses should account for to measure the true value of their various activities.

In its use for knowledge management, the invention can provide a searchable database for employees likely to be knowledgeable on particular topics. The search engine can rank its data records by confidence levels according to the amount of time that each person has spent communicating electronically about subjects of interest.

Extranets:

Corporate value chains (or networks) are evolving such that companies will eventually have secure extranet links to their suppliers, subcontractors, resellers, partners, and major customers. Tracking the flow of communication with, for example, individual suppliers and customers will enable corporate planners and strategists to rank suppliers and customers by the amount of corporate attention (measured in communication time) that they require compared with the volume and value of business transacted. Such information can be a useful diagnostic tool for deciding how to deal with various customers and business partners.

Below are some specific applications of the telecommunications-based time-management system:

1. Businesses can manage extended supply chains or channel partners and conduct activity-based costing in real-time, automatically, and with overhead costs objectively assigned to particular customers, partners, or suppliers.
2. Companies can measure the degree of integration of acquired firms or new partners based on the evolving nature and volume of the communication generated over time.
3. Organizations can benchmark their performance and analyze gaps by comparing the volume and nature of information flows with best practice within and outside the firm. For example, they might benchmark their progress in shifting communication to a Web-based "pull" model from an e-mail or phone "push" model of interaction.

4. Individual employees—whether top executives or freelance consultants—can track the use of their own time or that of their associates while comparing the resulting patterns to individual objectives and goals.

5. Companies can use the invention to improve the experience of Internet, intranet, and extranet users on the corporate Web site by recording, categorizing, and benchmarking the average time for users from log on to the corporate site until they are able to execute a transaction.

Public Internet

Many companies are already implementing solutions that measure the level of interest devoted to various aspects of their Web sites: this information is useful in diagnosing what works and what does not in the message they are trying to convey.

A particular application of this involves online media companies. As the business-to-consumer Internet evolves to one of free services supported by advertising, advertisers are able to pinpoint the amount they are willing to pay for inclusion at particular parts of documents or media segments. They are able to do so by the page or segment view, according to the amount of aggregate consumer attention devoted to it.

Unlike advertising metrics, however, the invention's analysis of communication flows is ideal for small groups like small businesses, limited number of members in a team, or a finite list of suppliers as well as larger aggregations of these sub-groups. By contrast, advertisement traffic metrics over the public Internet focus on averages—there are too many individual users coming to a typical retail consumer site for a given user's time per page to be meaningful in any sense.

Within a few years as converged Internet-protocol networks replace legacy systems, all forms of telecommunication—whether voice, data, text, images, video, and mixed media—will be measurable in terms of bytes (the stocks of information) and bandwidth (the flows of same). Ultimately, with the advent of personal-area networks (which are the wired-human-body equivalent of a corporate local-area network), time spent in face-to-face communication may also be automatically quantifiable. Similarly, organizations are increasingly using and accepting metadata like eXtensible Markup Language (XML) to facilitate business transactions and communications. Standards are still emerging under various forums like the Internet Engineering Task Force for such metadata as XML for messaging, XML for wireless applications, and XML for synchronizing data on disparate platforms. Once adopted, XML for messaging will facilitate tracking of various forms of telecommunication without the need for keyword scanning or topic gisting, which can require a lot of computing overhead. The proxy server of the present invention will be able to directly process communication records' XML metadata tags that identify the message and attachment types, key words, word count, duration, format, manner of encoding, or other attributes of interest without having to cull this information from different sources and media. Encrypted and encoded files would contain this XML metadata as an external wrapper, thus obviating the need for the proxy server to open and review each message as it passes through the system.

The electronic communications described herein should not be considered to be limiting. Types of electronic communications not specifically named are considered to be within the scope of the present invention.

Accordingly, the scope of the invention should be determined not by the embodiments illustrated, but by the appended claims and their legal equivalents.

I claim:

1. A method for managing electronic communications:
   recording a direction of a first electronic communication between a first entity and a second entity;
   determining a duration required for said second entity to process said first electronic communication;
   storing a data record of said first electronic communication comprising said direction, said duration, and identities of said first and said second entities in a database with at least one other data record of a second electronic communication;
   establishing a standard duration from the duration to process said first and said second communications; and
   comparing the duration to process subsequent electronic communications to said standard duration,
   whereby productivity of communicating entities may be determined through electronic communications.

2. The method of claim 1 further comprising the step of graphically presenting said first and said second communications.

3. The method of claim 1 further comprising the steps of:
   receiving a plurality of user-defined standards; and
   alerting a user when a communication violates one of said plurality of standards.

4. The method of claim 1 further comprising the step of reading a message-specific standard duration from metadata of a received electronic communication.

5. The method of claim 1 further comprising the steps of:
   determining a subject matter for each received communication; and
   storing said determined subject matter in said database in the data record for that electronic communication.

6. The method of claim 5, wherein the step of determining the subject matter further comprises reading subject matter data from said metadata.

7. The method of claim 5, wherein said first entity and said second entity are users and further comprising the steps of:
   determining for each said user the time applied by that user to a selected subject matter; and
   providing each said user with a rank in response to said time determining step.

8. The method of claim 7 further comprising the step of associating said rank with business data.

9. The method of claim 1, wherein said electronic communications further comprise telephone calls.

10. The method of claim 1, wherein said electronic communications further comprise e-mails.

11. The method of claim 1, wherein said electronic communications further comprise video data.

12. The method of claim 1, wherein said electronic communications further comprise transferred data files.

13. The method of claim 12, wherein said electronic communications further comprise mix-media data.

14. The method of claim 1, wherein said electronic communications further comprise instant messaging.

15. The method of claim 1, wherein said electronic communications further comprise image files.

16. The method of claim 1, wherein said step of establishing a standard duration further comprises establishing said standard duration using the size and data format of the electronic communication.

17. A system for managing electronic communications, comprising:

means for recording a direction of a first electronic communication between a first entity and a second entity;

means for determining a duration required for said second entity to process said first electronic communication;

a database for storing a data record of said first electronic communication comprising said direction, said duration, and identities of said first and said second entities, said database storing at least one other data record of a second electronic communication;

means for establishing a standard duration from the duration to process said first and said second communications; and means for comparing the duration to process subsequent electronic communications to said standard duration, whereby productivity of communicating entities may be determined through electronic communications.

18. The system of claim 17 further comprising means for graphically presenting said first and said second communications.

19. The system of claim 17 further comprising:

means for receiving a plurality of user-defined standards; and means for alerting a user when a communication violates one of said plurality of standards.

20. The system of claim 17 further comprising means for reading a message-specific standard duration from metadata of a received electronic communication.

21. The system of claim 17 further comprising:

means for determining a subject matter for each received communication; and means for storing said determined subject matter in said database in the data record for that electronic communication.

22. The system of claim 21, wherein the means for determining the subject matter further comprises reading subject matter data from said metadata.

23. The system of claim 22 further comprising:

means for determining for each said user the time applied by that user to a selected subject matter; and means for providing each said user with a rank in response to said time determining step.

24. The system of claim 23 further comprising means for of associating said rank with business data.

* * * * *